United States Patent [19]
Leach

[11] Patent Number: 6,137,868
[45] Date of Patent: Oct. 24, 2000

[54] OUTAGE NOTIFICATION DEVICE

[76] Inventor: Mark A. Leach, 3631 W. Point Cir., Lizella, Ga. 31052

[21] Appl. No.: 09/105,287

[22] Filed: Jun. 25, 1998

Related U.S. Application Data

[60] Provisional application No. 60/052,061, Jul. 9, 1997.

[51] Int. Cl.[7] .................................................. H04M 11/00
[52] U.S. Cl. ........................................ 379/106.01; 379/39
[58] Field of Search .................................. 379/37, 39–40, 379/47, 49–50, 106.01, 106.03; 340/531, 533, 539, 870.02, 870.03

[56] References Cited

U.S. PATENT DOCUMENTS

| | | |
|---|---|---|
| 5,010,568 | 4/1991 | Merriam et al. . |
| 5,031,209 | 7/1991 | Thornborough et al. .......... 379/106.03 |
| 5,408,523 | 4/1995 | McEachern et al. . |
| 5,784,441 | 7/1998 | Davis et al. ........................ 379/106.01 |

*Primary Examiner*—Curtis A. Kuntz
*Assistant Examiner*—George Eng
*Attorney, Agent, or Firm*—Brian D. Bellamy

[57] ABSTRACT

An embodiment of a electric power outage notification device is disclosed that combines several components including voltage transformation, a comparator circuit, a microprocessor and a data/fax modem chip. The invention further incorporates support components that aid in its overall functionality including a read-only memory, random access memory and a real-time clock. The unit is fully programmable using these components and can be programmed by software means to send an outage report to a selected remote computer modem, facsimile machine or alphanumeric pager. This outage report is sent to a programmed phone number after a power outage of a predetermined duration of time. The unit also reverses its role by providing notification of restored power.

6 Claims, 4 Drawing Sheets

FIG. 5

POWER OUTAGE REPORT

| ID NUMBER | DESCRIPTION | DURATION | POWER DOWN / UP | | EVENT NUMBER |
|---|---|---|---|---|---|
| | | | DATE | TIME | |
| 000010 | Sub#3 Cir#2 Phs#1 353-08-678__ | 00:00:01 | 07/01/97 | 10:30:57 | 0 |
| | | | 07/01/97 | 10:30:58 | 1 |
| 000010 | Sub#3 Cir#2 Phs#1 353-08-678__ | 00:00:26 | 07/01/97 | 11:20:15 | 2 |
| | | | 07/01/97 | 11:20:41 | 4 |
| 000010 | Sub#3 Cir#2 Phs#1 353-08-678__ | 00:00:02 | 07/01/97 | 11:20:45 | 5 |
| | | | 07/01/97 | 11:20:47 | 6 |
| 000010 | Sub#3 Cir#2 Phs#1 353-08-678__ | 00:00:02 | 07/01/97 | 11:20:48 | 7 |
| | | | 07/01/97 | 11:20:50 | 8 |
| 000010 | Sub#3 Cir#2 Phs#1 353-08-678__ | 00:00:46 | 07/01/97 | 11:20:51 | 9 |
| | | | 07/01/97 | 11:21:37 | 10 |
| 000020 | Sub#8 Cir#2 Phs#6 143-09-165__ | 00:00:02 | 07/01/97 | 11:24:39 | 11 |
| | | | 07/01/97 | 11:24:41 | 12 |
| 000020 | Sub#8 Cir#2 Phs#6 143-09-165__ | 00:00:01 | 07/01/97 | 11:24:42 | 13 |
| | | | 07/01/97 | 11:24:43 | 14 |
| 000020 | Sub#8 Cir#2 Phs#6 143-09-165__ | 00:00:01 | 07/01/97 | 11:24:44 | 15 |
| | | | 07/01/97 | 11:24:45 | 16 |
| 000020 | Sub#8 Cir#2 Phs#6 143-09-165__ | 00:00:38 | 07/01/97 | 11:24:47 | 17 |
| | | | | 11:25:25 | 18 |
| 000030 | 1st House Past Smithville Rd._ | 00:01:00 | 07/01/97 | 11:26:22 | 19 |
| | | | 07/01/97 | 11:27:22 | 20 |
| 000030 | 1st House Past Smithville Rd._ | 00:00:01 | 07/01/97 | 11:27:24 | 21 |
| | | | 07/01/97 | 11:27:25 | 22 |
| 000030 | 1st House Past Smithville Rd._ | | 07/01/97 | 11:27:26 | 23 |
| 000030 | 1st House Past Smithville Rd._ | 00:00:11 | 07/01/97 | 11:27:34 | 24 |
| | | | 07/01/97 | 11:27:45 | 25 |
| 000040 | Plant#1, Crushing Machine_____ | 00:03:55 | 07/01/97 | 11:26:36 | 26 |
| | | | | 11:30:31 | 27 |
| 000050 | _____ | 00:00:20 | 07/01/97 | 11:39:22 | 28 |
| | | | 07/01/97 | 11:39:42 | 30 |
| 000050 | _____ | 06:52:14 | 07/01/97 | 11:39:49 | 31 |
| | | | 07/01/97 | 18:32:03 | 33 |
| 000050 | _____ | 00:00:01 | 07/01/97 | 18:32:07 | 34 |
| | | | 07/01/97 | 18:32:08 | 35 |
| 000050 | _____ | 00:00:01 | 07/02/97 | 12:48:32 | 36 |
| | | | 07/02/97 | 12:48:33 | 37 |
| 000050 | _____ | 00:00:01 | 07/02/97 | 15:17:58 | 38 |
| | | | 07/02/97 | 15:17:59 | 39 |

OUTAGE NOTIFICATION DEVICE

This application claims the benefit of U.S. Provisional application Ser. No. 60/052,061, filed Jul. 9, 1997.

FIELD OF THE INVENTION

The present invention relates to an electric power outage notification device, particularly adapted to monitor and report loss of electric power via standard telephone lines to a selectively programmable choice of computer, facsimile, or pager.

BACKGROUND OF THE INVENTION

Presently, most utility companies have to rely on their customers to physically call in and report power outages and their location. The process of collecting these calls and gathering enough information to restore an outage takes a great amount of time.

Various products are available that help automate the process of detecting power outages and reporting them for utilities. Typically, these known devices are permanently programmed and use telephone lines for communicating their identity back to the utility. These known devices generate DTMF tones and send them to a converter box that converts the tones to a serial format. In most cases, this converter box is attached to a personal computer at the electric utility. This known system works adequately for collecting data, but requires the purchase and connection of a separate converter box to a serial port of a personal computer that is dedicated to use for outage notification. In the known devices, the personal computer becomes the catalyst for generating the desired output of a facsimile or paging signal. Thus, utilities are required to invest into a personal computer that can only be used for collecting outage data, and both the computer and its serial port become unavailable for other uses.

A remote meter reading system that utilizes telephone line and modems to obtain electric power data is described in U.S. Pat. No. 5,010,568 to Merriam et al. entitled "Remote Meter Reading Method and Apparatus." The Merriam meter reading system is typical of prior art electric power information systems that collect data and outputs that data in DTMF tones. These type of prior art devices, including the Merriam system, send the DTMF tones to a converter box that translates the data into ASCII code and then sends the information to a dedicated utility company computer.

A utility reporting system that utilizes facsimile to output a report to the utility without an intervening computer system is described in U.S. Pat. No. 5,408,523 to McEachern entitled "Electronic Remote Data Recorder with Facsimile Output for Utility AC Power Systems." The McEachern system measures AC power parameters and communicates them telephonically to a facsimile device only. The McEachern system does not disclose any method of communicating a power report to a selectively programmable choice of the utility computer, a facsimile device, or a pager device.

Like most businesses, utilities face human resource limitations and high equipment costs. Furthermore, as power companies face deregulation and increased competition, customer service is even more important to retain business. A primary concern of customers is that they do not lose power for long periods of time. One of the primary reasons for time delay in restoring power is the lack of knowledge of the occurrence and location of the outage by the utility. Also, power outages are subject to occur at any time day or night. Utility personnel may be available at varying locations, and, therefore, a method and apparatus for transmitting power outage notification reports to a computer, facsimile machine, or pager according to variable parameters is needed and would be very desirable.

SUMMARY OF THE INVENTION

One object of the present invention is to provide an inexpensive and effective power outage notification device by eliminating the need for a dedicated computer and DTMF tone converter box.

Another object of the present invention is to provide a device for reporting electric power information to utilities by delivery to a selectively programmable choice of computer, fascimile machine or pager.

Another object of the present invention is to provide a device that can be programmed remotely via telephone line to change operational information such as telephone numbers, locations, and notification means.

The present invention provides a device for transmitting electric power information to a utility by incorporating its own programmable data/fax modem chip in combination with a microprocessor. This data/fax modem chip and microprocessor, combined with volatile random access memory, allow the invention to be reprogrammed at will and used as a stand-alone device. The device stores the necessary information relating to its physical location and sends this information in ASCII format across telephone or cable lines after detecting an outage condition. Therefore, no converter box is necessary to interpret DTMF tones. Further, the device can be programmed, at will, to send its electric power information to a choice of computer, facsimile machine or pager. If a facsimile machine or pager is selected to receive the information, no computer is needed for the device to operate and send or receive information.

Because the data/fax modem chip used in the present invention allows the invention to be a stand-alone device with the ability to dial-out to a computer, facsimile machine or pager, personnel do not have to stand by a computer to select the message destination. The data/fax modem chip allows for bi-directional communications between the device and a computer located at the utility office. Using the bi-directional communication capabilities of the device, the device can be reprogrammed by changing a previously programmed parameter in the software program controlling the device at the computer.

These and further objects of the invention will be apparent from the following description of preferred embodiments thereof.

BRIEF DESCRIPTION OF THE DRAWINGS

The invention is further described in connection with the accompanying drawings.

FIG. 5 shows the general format of an outage notification report created by the invention and delivered to a fascimile machine.

DETAILED DESCRIPTION

Figure 1:
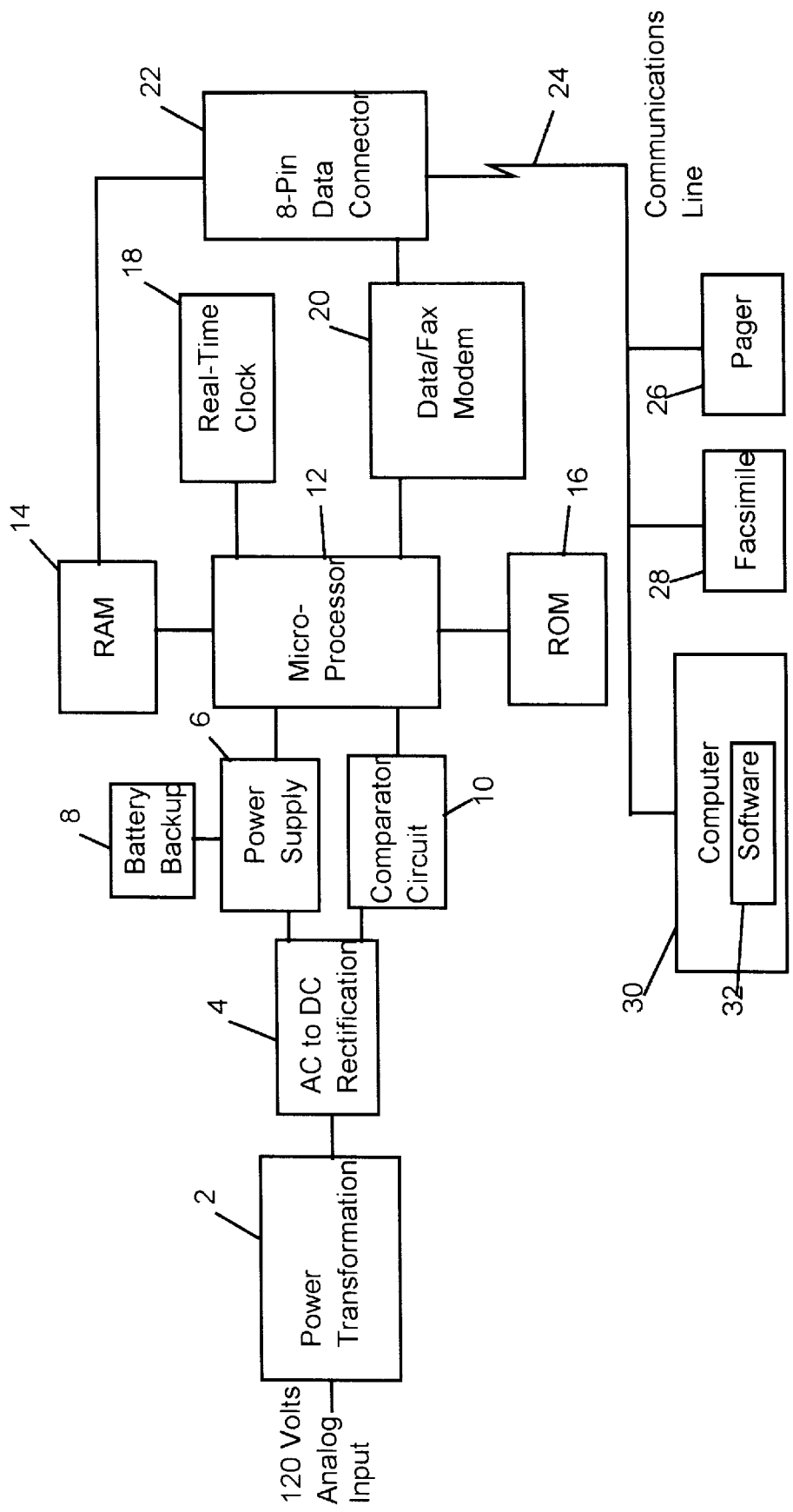
FIG. 1 shows a block diagram of an embodiment of the invention.

A preferred embodiment of a remote power outage notification device of the present invention is shown in the block diagram of FIG. 1. The present device samples the voltage available on a standard 120 volt receptacle. Beginning at the lefthand side of FIG. 1, a voltage is delivered to a power transformer 2 from a standard electrical terminal or the like, and the power transformer steps down the 120 volts at the terminal to 12 volts. An AC to DC voltage rectifier 4 rectifies the voltage from AC to DC. The rectified and reduced voltage provides electric power to a power supply 6 in which various well-known electronic components are grouped in a common arrangement within the power supply to provide voltage and current to the various components of the invention according to each components pre-determined voltage and current requirements. In the event of a loss of power to the power supply, a battery backup 8, preferably consisting of a rechargeable nicad battery, provides electric power to the power supply in leiu of the rectified and reduced voltage described above.

The reduced voltage is further used by the invention as a reference voltage. A comparator circuit 10 is coupled to the AC to DC voltage rectifier and receives the reference voltage. The comparator circuit constantly samples the reference voltage and compares it against a predetermined set voltage mark. If the reference voltage falls below the set voltage mark, then the device flags the reference voltage as being an outage and initiates a signal to a microprocessor 12, which could result in an outage notification report. Once the reference voltage is flagged, the comparator circuit repeats the sampling procedure for determining when the power is in the on condition, rather than an outage. If the reference voltage rises above a set voltage mark, then the device flags the reference voltage as being a power on condition and initiates a signal to the microprocessor.

Random access memory (RAM) chipsets 14 are used to hold user programmed and reprogrammable information such as phone numbers, operational settings and location information. Read only memory (ROM) chipsets 16 are used to support the microprocessor by storing firmware code that includes routines for controlling the execution of the microprocessor. The microprocessor is further supported by the real-time clock chip 18 that is used for all of the timing and calendar functions of the device.

By programming and utilizing the RAM 14, the microprocessor 12, and a data/fax modem chip 20 in a novel manner, the present invention is unique in that it may initiate and send a response message by a choice of several communication modes directly to a choice of computer, facsimile machine or pager without the use of an intermediary computer and without the use of DTMF tones. Once the device has initiated a call instruction, the microprocessor issues a command to the data/fax modem chip 20 for processing a call.

The microprocessor is programmed with information provided from the RAM 14 to command the data/fax modem chip 20 to send a message to a particular phone number and recipient computer, fascimile machine or pager. The message is transmitted via a communication line 24 that is a standard telephone line in the preferred embodiment. However, the device could also be adapted to communicate via cable lines, cellular, or other communication means.

If data is to be sent to the computer 30 at the utility, the data/fax modem chip dials out to a modem operating with the computer. The combination of the RAM and microprocessor enables the device to transmit data via the data/fax modem chip in ASCII format. Therefore, data sent from the device to the computer is transmitted in ASCII format when the invention is practiced in its preferred embodiment. The computer receives the data, and software operating on the computer manipulates the data and logs it to a database. If the facsimile machine is the desired message destination, the RAM provides programming information to the microprocessor which executes an operational routine in conduction with the data/fax modem chip and arranges the data into an appropriate binary message format recognized by a fascimile machine. If the pager is the desired message destination, the data is delivered in an ASCII format. In one embodiment, an ASCII message including an identification number representing the location of the power change and a number signifying the change in power could be sent to a numeric type pager device.

The variable programming information in the RAM 14 is received from programming software 32 present on the computer 30. The user programmed information is communicated to the RAM whenever the invention contacts the utility computer with the programming software thereon. Information from the programming software is transmitted serially from the computer to the RAM via the same communication means or telephone line that the data/fax modem 20 communicates with the computer. An 8-pin data connector 22 is used to connect the data/fax modem chip 20 to the outside communications line. Of the eight pins on the 8-pin connector only four are used by the data/fax modem chip. The remaining four pins are used by the device to transmit data directly from the communications line to the RAM using serial communication. The device may be pre-programmed to call the utility computer on a regular schedule, and the data contained in RAM may be updated regularly when the device connects to the computer. Using bi-directional communication capability, the software on the computer communicates updated data back to the RAM on the device utilizing the serial communication betweeen the computer and the RAM.

Figure 2:
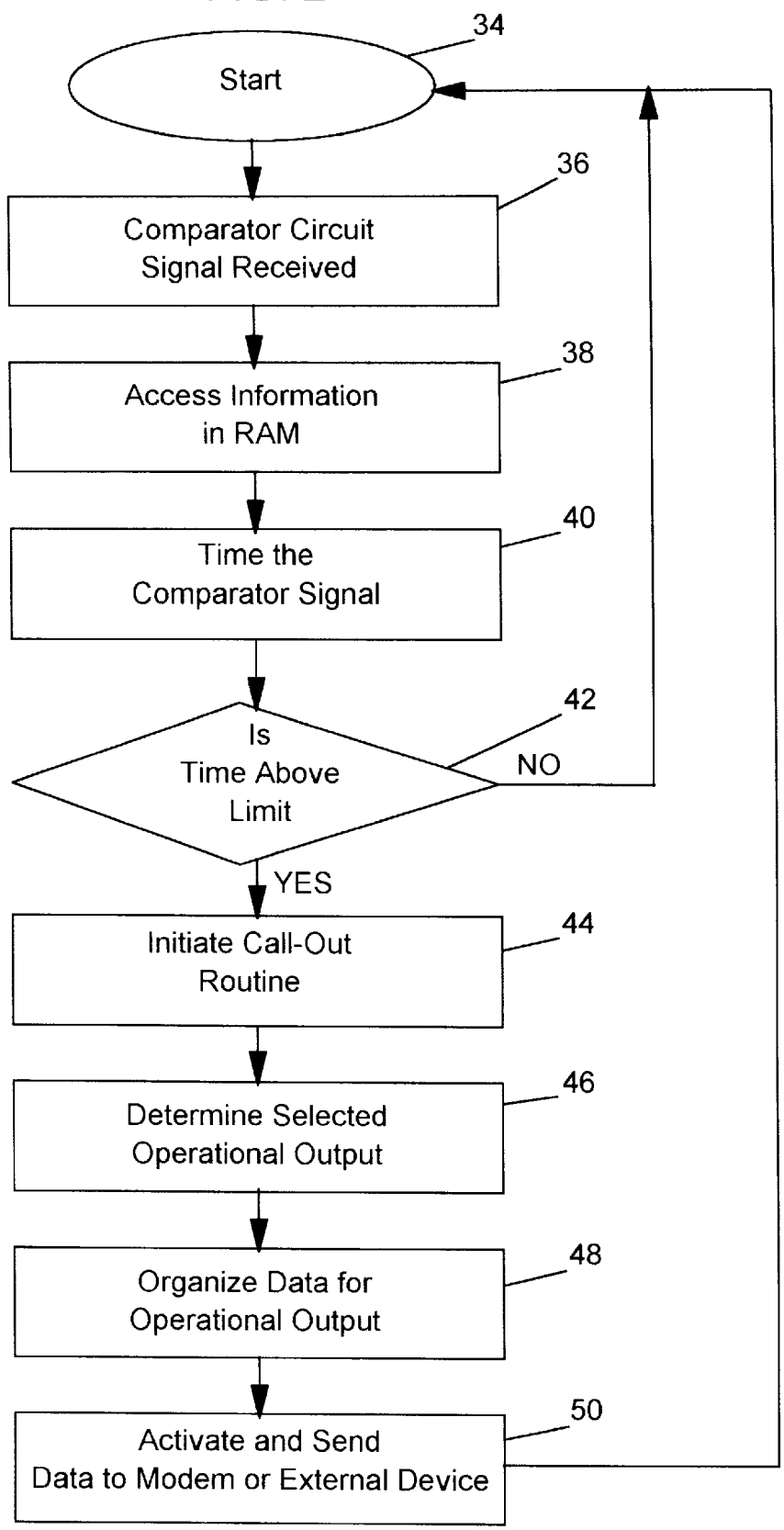
FIG. 2 shows a flow diagram of the algorithm executed by the program controlling the microprocessor of the invention.

Turning now to FIG. 2, the flow chart illustrates in more detail the algorithm executed by the microprocessor 12. The algorithm enters a loop at START 34. Block 36 acquires a signal sent from the comparator circuit 10 indicating a power out or power on condition. After the power change signal is received, block 38 accesses the information stored in the volatile RAM 14, Block 40 times the signal, and block 42 compares the time from block 40 with a programmed time limit. If the time limit of block 42 is exceeded, block 44 initiates a call-out routine to report the power change. If the time limit of block 42 is not exceeded before a second signal is acquired, then the algorithm returns to START 34. Once the call-out routine is initiated, block 46 uses the information in RAM to determine the selected operational method for delivering the power outage information. Block 48 organizes the data into the appropriate format according to the selected operational method. Then, block 50 activates the data/fax modem chip 20 and sends the data to the modem with instructions.

Figure 3:
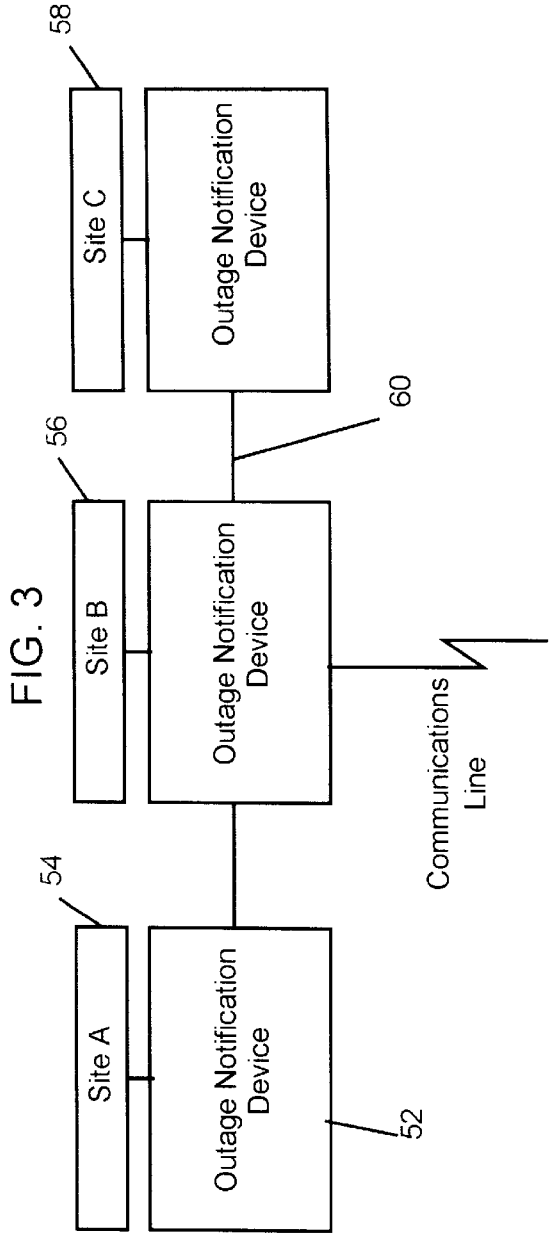
FIG. 3 shows a block diagram of an application of the invention for spacially close locations.
Figure 4:
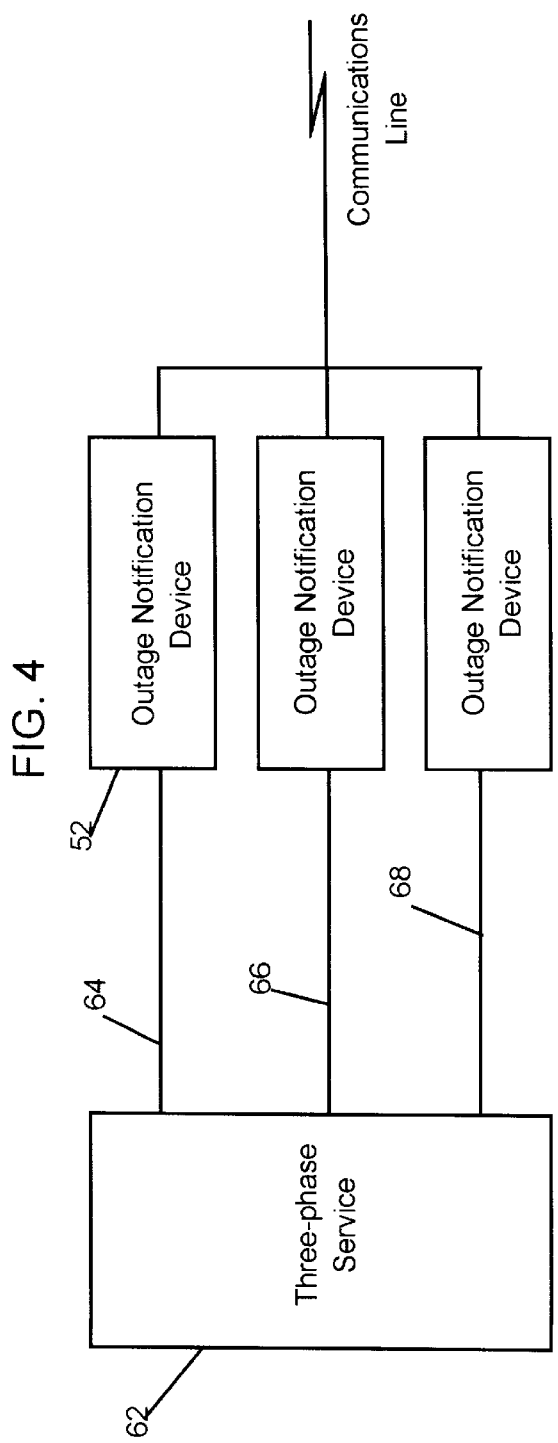
FIG. 4 shows a block diagram of an application of the invention for three-phase electrical service.

The present invention is versatile and can be used for outage notification in residential, commercial, industrial, and three-phase applications. In single-phase applications, the present outage notification device 52 can be used to monitor whole homes or specific pieces of equipment. As shown in FIG. 3, several of the devices could be used to monitor several locations in close proximity, for example site A 54, site B 56, and site C 58. The devices could be connected together via a means for communicating serially 60, or the devices could each be individually connected to the communications line. In three-phase applications as shown in FIG. 4, the outage notification device 52 of the present invention is connected to a three-phase service 62 at each of it legs 64, 66, and 68. Three of the devices are combined and each device is connected to a leg of the three-phase service so that each phase of the service is monitored. The three devices can be all connected to a single communications line. Whereby, three-phase outage notification is accomplished.

A representative outage notification report sent to a fascimile machine and generated thereby is shown in FIG. 5 having several entries from various locations.

While preferred embodiments of the invention have been shown and described, those skilled in this art will recognize that various modifications may be made in these embodiments without departing from the spirit and scope of the present invention. Therefore, the scope of the present invention is set forth in the claims that follow.

I claim:

1. An electric power outage notification device for notifying utilities of the time and location of a power outage that comprises:
   a. a means for receiving an analog voltage input that provides a power supply and a reference voltage;
   b. a means for providing a signal indicating a change in the reference voltage;
   c. a microprocessor coupled to the power supply means and coupled to the outage signal generating means;
   d. a volatile random access memory coupled to the microprocessor for storing user programmable data and instructions used by the microprocessor;
   e. a read only memory coupled to the microprocessor for providing the microprocessor preprogrammed instructions;
   f. a real-time clock coupled to the microprocessor for providing the microprocessor current time and date information;
   g. a programmable data/fax modem chip coupled to the microprocessor for transferring data between the data/fax modem chip and the microprocessor and communicating an outage notification report to an external communications medium that delivers the report to a user selected choice of a remote computer, a facsimile device, or a pager;
   h. a means for connecting the programmable data/fax modem chip and the volatile random access memory to the external communications medium such that data can be transferred to or from either the data/fax modem chip or the volatile random access memory;
   i. a programming software means for sending user programmed data and instructions to the volatile random access memory;
   whereby said device monitors electric power supply.

2. An electric power outage notification device for notifying utilities of the time and location of a power outage that comprises:
   a. a power transformer coupled to a 120 volt AC power receptacle for stepping down a 120 volt power supply to supply a 12 volt power source and reference voltage;
   b. an AC to DC voltage rectifier coupled to the power transformer for rectifying the 12 volt power source and reference voltage from AC to DC;
   c. a power supply coupled to the AC to DC voltage rectifier for providing power to the components of the device;
   d. a comparator circuit coupled to the AC to DC voltage rectifier for comparing the reference voltage provided by the rectifier to a predetermined set voltage and providing a signal when the reference voltage falls below the set voltage;
   e. a microprocessor coupled to the power supply and the comparator circuit for receiving a signal from the comparator circuit;
   f. a volatile random access memory coupled to the microprocessor for storing user programmable data and instructions used by the microprocessor;
   g. a read only memory coupled to the microprocessor for providing the microprocessor preprogrammed instructions;
   h. a real-time clock coupled to the microprocessor for providing the microprocessor current time and date information;
   i. a programmable data/fax modem chip coupled to the microprocessor for transferring data between the data/fax modem chip and the microprocessor and communicating data for an outage notification report to a telephone line that carries the report data to a user selected choice of a remote computer, a facsimile device, or a pager;
   j. an 8-pin data connector coupled to the programmable data/fax modem chip and the volatile random access memory for transferring data between the outage notification device and the telephone line;
   k. a programming software means for sending user programmed data and instructions to the volatile random access memory via the telephone line coupled to the 8-pin connector.

3. An electric power outage notification device as described in claim 1 wherein said means for receiving said analog voltage input includes a power transformer coupled to a 120 volt AC power receptacle for stepping down a 120 volt power supply to a 12 volt power source and reference voltage and an AC to DC voltage rectifier for rectifying the 12 volt power source and reference voltage from AC to DC and said signal generating means includes a comparator circuit for comparing the reference voltage to a predetermined set voltage and providing said signal when the reference voltage falls below the set voltage.

4. An electric power outage notification device as described in claim 1 wherein said means for connecting the programmable dara/fax modem chip and the volatile random access memory to the external communications medium such that data can be transferred to or from either the data/fax modem chip or the volatile random access memory includes an 8-pin data connector coupled to the programmable data/fax modem chip and the volatile random access memory.

5. An electric power outage notification device as described in claim 1 in which more than one of said devices are provided and each device is connected to a location providing said analog voltage input within close proximity of at least one other location providing said analog voltage input, each device being connected to the other devices via a means for communicating serially such that said devices are connected at a single location to said communication medium, whereby said device is especially useful for monitoring electrical power supply on multiple peices of equipment within a single facility.

6. An electric power outage notification device as described in claim 1 in which three of said devices are provided and each is connected to a single leg of a three-phase electrical service such that each leg provides said analog voltage input to its respective device, all of said devices being connected to a single communication line, whereby said device is especially useful for monitoring three-phase power supply.

* * * * *